United States Patent [19]
Li et al.

[11] 3,785,779
[45] Jan. 15, 1974

[54] GAS LIQUID INLET DISTRIBUTOR

[75] Inventors: Sik U. Li, Morris Township, Morris County; Robert M. Koros, Westfield, both of N.J.

[73] Assignee: Esso Research and Engineering Company, Linden, N.J.

[22] Filed: Aug. 2, 1971

[21] Appl. No.: 168,269

[52] U.S. Cl. .................. 23/284, 23/285, 23/252 R, 261/124, 259/4, 239/558, 239/548, 239/567, 239/590.5, 239/559
[51] Int. Cl. ........................... B05b 7/04, B01j 1/00
[58] Field of Search .................. 23/284, 285, 252, 23/288 S, 288 R; 259/4; 261/124, 121, 77; 34/57 A; 239/558, 548, 556, 559, 567, 590.5, 601

[56] References Cited
UNITED STATES PATENTS 3,133,128  5/1964  McDonald ........................ 23/285 X
3,219,483  11/1965  Goos et al. ..................... 23/252 R X Primary Examiner—James H. Tayman, Jr.
Attorney—F. Donald Paris et al.

[57] ABSTRACT

A distributor for introduction of mixed gas and liquid into a vessel which provides improved mixing of the vessel's contents and intimate contact between the gas and liquid by formation of small gas bubbles. Two phase flow is baffled to assure a uniform dispersion of liquid in gas prior to sparging the mixture into the vessel. Sparging takes place at high velocities to provide a multiplicity of small gas bubbles created by the shearing action of the liquid passing through the openings in the sparger.

4 Claims, 3 Drawing Figures

PATENTED JAN 15 1974

3,785,779

INVENTORS
SIK U. LI
ROBERT M. KOROS
BY
ATTORNEY 3,785,779

GAS LIQUID INLET DISTRIBUTOR

BACKGROUND OF THE INVENTION

Many important industrial operations employ reactor vessels where gases and liquids must be contacted in order for a desired chemical reaction to proceed. Typical gas-liquid operations are hydrofining of oils, hydrocracking of heavy hydrocarbons into lighter compounds, hydrogenation of olefins and aromatics and oxonation of olefins to aldehydes. While it is particularly difficult to insure good mixing of the gas and liquid, this is essential in order to achieve the best results in the reactor. Maintaining a well mixed condition is difficult due to the fact that gases and liquids can separate unless they are traveling at such speeds that they mix inherently. Dispersed gas bubbles tend to coalesce and this should be avoided. However, in commercial reactors where relatively long residence time normally is required, the flow rates are such that the separation of gas and liquid is quite significant, especially in upflow reactors. Often, beds of catalyst are present or the vessel may be packed with inert materials, both means of providing mixing and avoiding separation of the gas and liquid. In spite of the use of such packings the chemical reactions are often not as uniform as is desired. In some cases the performance of the entire reactor system is especially dependent on the degree of mixing of the gas and liquid as where they are reacting rapidly and where large heat effects are involved.

Gases and liquids tend to separate in reactor vessels having relatively large holdups, but this is also true even in pipelines which feed such vessels. The gases and liquids will tend to separate as determined by the velocities involved. There are a number of types of two phase flow which have been identified in connection with pipeline operation. One is "wave flow" wherein the liquid travels along the bottom of the pipeline with the gas above and, in much the same fashion as waves are propagated by winds in large open bodies of water, the liquid has a continuous undulating motion. Another type is "slug flow" wherein the gas velocity is higher than in "wave flow" causing slugs of liquid to form the travel along the pipe, preceded and followed by gas bubbles. This type of flow, as would be expected, is extremely uneven and generally undesirable. A third type of flow is "annular flow" wherein liquid travels along the wall of the pipe with gas flowing in the center. The separation of gas and liquid is relatively complete and undesirable from the standpoint of obtaining uniform distribution of gas and liquid. A fourth type is "mist flow" wherein the liquid is dispersed as drops within the gas. This type of flow is highly desirable if good distribution is to be obtained. Since the type of flow which prevails is determined by the physical properties of the liquids and gases and the rates at which they travel, any type of flow pattern may occur. As has been shown, many types of flow are undesirable. If a two phase mixture is passing through a pipe and being directed into a reactor it will be important to obtain the maximum degree of mixing before the liquid and gases enter the reactor. Otherwise, undesirable variations will occur within the reactor resulting from non-uniform flow. It can also be seen that the performance of any distributor at the reactor inlet will be affected by the type of two phase flow which occurs in the inlet line. However, prior art distributors generally have not provided for the unusual nature of two phase flow.

The present inventon has a primary object, improving the flow pattern within the pipeline and obtaining the best possible distribution of the gas and liquid into the reactor vessel. This is obtained by means of the novel distributor disclosed herein. Excellent dispersion of gas in the liquid is obtained in the reactor and intimate contacting is achieved by the formation of a multiplicity of tiny gas bubbles which provide a large interface at which gas-liquid reactions can take place. In addition, the distributor can mix the reacting contents of the vessel by utilizing energy of the jets issuing from the distributor itself. The novel distributor has the ability to translate a random or irregular and often segregated flow of gas and liquid in the pipeline into a very fine and uniformly dispersed swarm of tiny bubbles within a continuous liquid phase in a reactor.

SUMMARY OF THE INVENTION

The distributor constructed according to the invention comprises a novel sparger and baffling system which achieve the desired highly uniform, finely divided gas-liquid mixture. A gas and liquid mixture travelling in a pipe and about to enter the reactor vessel may be highly irregularly distributed. When such a gas-liquid mixture meets the baffling system, the two phase mixture is dispersed thereby providing a uniform mixture to the novel sparger. The sparger is arranged to avoid separation of the inflowing uniform mixture and to distribute the uniform mixture through a multitude of holes, normally located along the surface of the sparger in the overall direction of flow. A high pressure drop is provided by the holes in order to assure that a shearing action occurs as gas and liquid pass through the holes so that gas bubbles of very small diameter are created. The high pressure drop through the holes in the distributor is the result of the high velocities of the gas and liquid passing therethrough. The result of the high velocities is not only to create small bubbles, but to create jets downstream of the holes which will provide a mixing effect in the bulk of gas and liquid within the reactor itself. This maintains the highly mixed condition. It has been observed that the number of bubbles coalescing is approximately equal to the number of coalesced bubbles which are broken up into smaller ones by the vigorous mixing action which occurs.

DESCRIPTION OF THE PREFERRED EMBODIMENT

Figure 1:
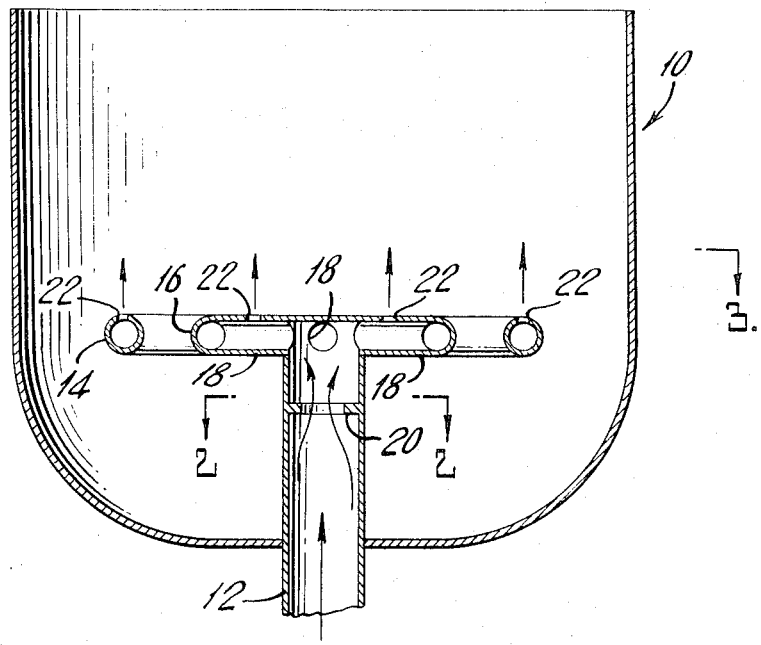
FIG. 1 shows a vertical cross section of the bottom portion of a typical reactor vessel in which has been installed an upflow version of a novel distributor according to the present invention.

FIG. 1 shows an overall view of a typical installation of the novel distributor according to the invention situated in the bottom of a reactor in which gas and liquid flowing together are introduced into the reactor. While this is a typical service for a gas and liquid distributor, it may be used in any position with the holes located in the general direction of flow. It would often be the case in mixed phase flow that gas and liquid would be introduced from the bottom of the reactor in order to minimize the separation of gas and liquid which tends to occur and which is more severe when the gas and liquid are introduced together at the top of the reactor. The reactor is shown generally as 10. The distributor comprises an inlet of feedline 12 through which the mixed phase flow is passed, an inlet dispersion baffle 20 extending transversely to the direction of flow in the feedline 12 upstream of the sparger, and the sparger rings 14 and 16 with the interconnecting headers 18. Gas passes upward in the direction shown by the arrows. Although not shown, packing or catalyst could be located above the sparger rings.

Figure 2:
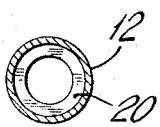
FIG. 2 shows the inlet baffle for providing a dispersed flow for the distributor viewed along line 2—2 of FIG. 1.

FIG. 2 shows a typical inlet dispersion baffle 20, which in this case is an annular disc having a center opening located in the mixed phase feedline 12 below the sparger. The function of the baffle 20 is to effect a dispersion of liquid in gas. As previously discussed, gas and liquid flowing in pipelines will tend to separate and any one of several types of flow regimes may be created. Depending on the size of the pipe, the flow rates involved, and the properties of the fluids any or all of these types of flow may be present during the operation of the reactor. The baffle serves to break up the naturally occurring two phase flow, particularly "annular flow" in which liquid is passing along the walls with the gas in the center of the pipe. If liquid were passing along the wall, it would be forced through the center of the baffle where it would be picked up by the gas flowing at increased velocity and turbulence through the opening and thereby dispersed into the gas. The baffle illustrated is perhaps the simplest type which might be used. However, it is within the scope of this invention for various other configurations to be employed which may be even more effective for certain types of flow. The baffle 20 provides a liquid dispersed in gas, such condition being desirable for good distribution of the mixed phases from the sparger rings. It can be seen that should the separation of gas and liquid which occurs in pipelines be permitted to continue uninterrupted until the mixed phase reaches the distributor rings, that the segregation of phases will cause a maldistribution of gas and liquid to the holes and will result in the gas being introduced in larger bubbles than will be formed when a dispersed liquid and gas mixture is being sparged. The dimensions of the baffle will be adjusted depending upon the ratio of gas to liquid flows involved. Ordinarily the baffle will be located between one and two times the diameter of feedpipe 12 away from the distributor rings 14 and 16 in order to assure proper dispersion of liquid in gas but to avoid recombination of the liquid droplets before the sparger.

Figure 3:
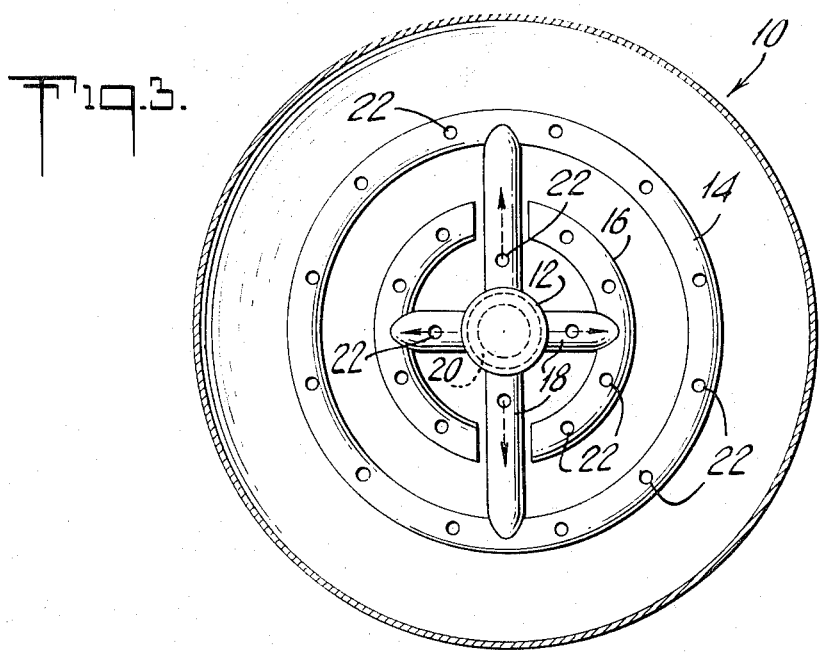
FIG. 3 shows a cross sectional view of the distributor taken substantially along line 3—3 of FIG. 1.

FIG. 3 shows a plan view of the sparger rings 14 and 16 taken substantially along line 3—3 of FIG. 1. Gas and liquid entering through feed pipe 12 are dispersed by dispersion baffle 20, and distributed by sparger rings 14 and 16. The arrangement of the distributor rings is not arbitrary. It has been determined to be particularly satisfactory with gas-liquid flows where it is important to maintain a dispersed mixture not only for good distribution into the reactor vessel, but also to provide a maximum shearing action of the liquid on the gas when they pass through the holes 22, as will be discussed in further detail hereinafter. While other arrangements and distributors might be used, the distributors should be so arranged so as to cover the cross-section of the area of the reactor as uniformly as possible. Major variations in flow throughout the distributor rings should be avoided in order to avoid resegregation of gas and liquid which could occur at deadends or at points where the flow rates become much lower than the feedpipe. Flow from the feedpipe 12 via the headers 18 passes outwardly to the sparger rings 14 and 16 and out through the individual holes 22, which are uniformly distributed about the rings 14 and 16 in the general direction of flow. As previously mentioned, should the gas and liquid be sparged in other than upflow direction the holes should face in the general direction of flow in order to avoid flow reversals which could cause aggregation of the liquid particles which were previously dispersed by baffle 20 and to obtain the maximum mixing effect of the jets which emerge from the holes.

Inasmuch as a dispersion of liquid in gas has been created previously by the dispersion baffle 20, that mixture will find its way to each of the holes 22 in the distributor rings. At each hole both the gas and liquid will try to emerge simultaneously. If the holes are designed to provide a sufficient pressure drop, then liquid will create a significant shearing action on the gas and thereby create very small bubbles which will provide the maximum contact area for reaction between gas and liquid within the reactor itself. In addition, the jet of mixed gas and liquid which emerges will extend into the reactor body itself, creating considerable turbulence and providing a highly mixed condition thus avoiding the recombination of gas bubbles, which is undesirable when the objective is to obtain the most rapid, uniform reaction rate in which no localized overreaction or heating could occur.

The disclosed distributor design is particularly useful in an upflow gas-liquid reactor wherein no packing or catalyst bed is used and where only reactor holdup volume is used in order to facilitate the completion of the reaction. In such a reactor the performance of the distributor is especially important and the distributor of the present invention satisfies the requirements without the problems attendant to prior art designs which did not take into account the unusual nature of gas-liquid mixed phase flow.

The preferred embodiment represents only one possible way in which the principles disclosed may be employed. Other embodiments may be used without departing from the spirit of the invention as set forth in the claims which follow.

What is claimed is:

1. The combination of a closed reactor vessel having an inlet at the bottom end and an outlet at the top end and a distributor means at the bottom of said vessel for introducing a uniform mixture of gas and liquid into said vessel wherein said distributor means comprises:
   a. an inlet conduit having an end communicating with said inlet of said vessel whereby said gas and liquid mixture may be passed into said vessel;
   b. baffle means disposed in said conduit for uniformly mixing said gas and liquid, said baffle means being located relative to said communicating end of said conduit to avoid reseparation of said uniform mixture before it is introduced into said vessel;
   c. sparger means disposed within the bottom of said vessel in communication with said inlet conduit and arranged to introduce said uniform mixture evenly across said vessel in the direction of said outlet, said sparger means being characterized by avoidance of major variations in flow rate of said gas and liquid mixture passing therethrough and thereby preventing said gas and liquid mixture reseparation and having a plurality of equally spaced outlet openings facing toward said outlet and of sufficient size to require high velocities of the liquid and gas passing therethrough which creates an unhindered jet of gas and liquid in said vessel from each of said openings and thereby providing a high degree of mixing of the vessel's contents characterized by the number of bubbles coalescing being approximately equal to the number of coalesced bubbles broken into smaller bubbles by the mixing.

2. The distributor of claim 1 wherein said baffle means comprise an annular member extending transversely to the inner walls of said conduit and acting to force liquid flowing through said conduit to mix with gas flowing in said conduit.

3. The distributor of claim 1 wherein said sparger means comprise a plurality of concentric ring passageways having uniformly distributed openings located facing into said vessel and characterized by a high resistance to the flow of gas and liquid thereby creating a multiplicity of small gas bubbles and providing mixing of the vessels contents.

4. The distributor of claim 1 wherein said baffle means are located a distance between about 1 and about 2 times the diameter of said inlet conduit upstream of the said sparger means.

* * * * *